Sept. 27, 1955     S. S. DAY     2,718,660
APPARATUS FOR RECOILING COILS
Filed Jan. 4, 1955     3 Sheets-Sheet 1

INVENTOR
Samuel S. Day
BY
Adams, Forward & McLean
ATTORNEYS

Sept. 27, 1955  S. S. DAY  2,718,660
APPARATUS FOR RECOILING COILS
Filed Jan. 4, 1955  3 Sheets-Sheet 2
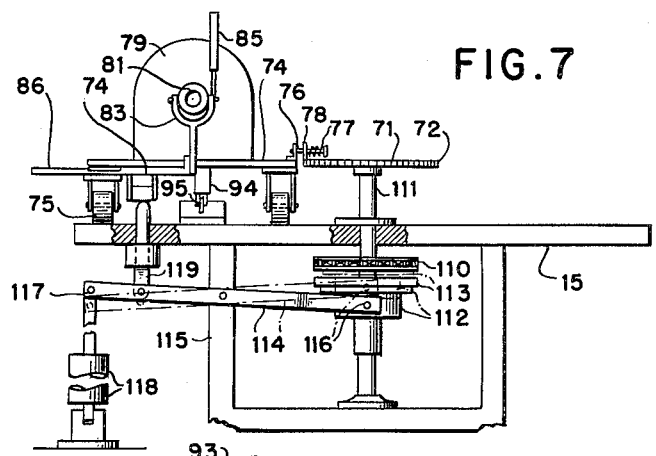
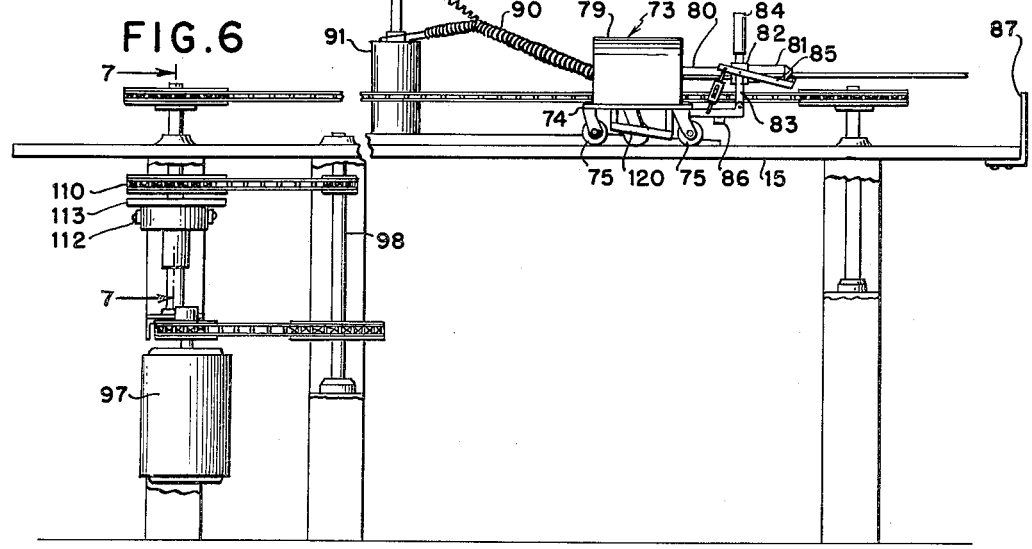
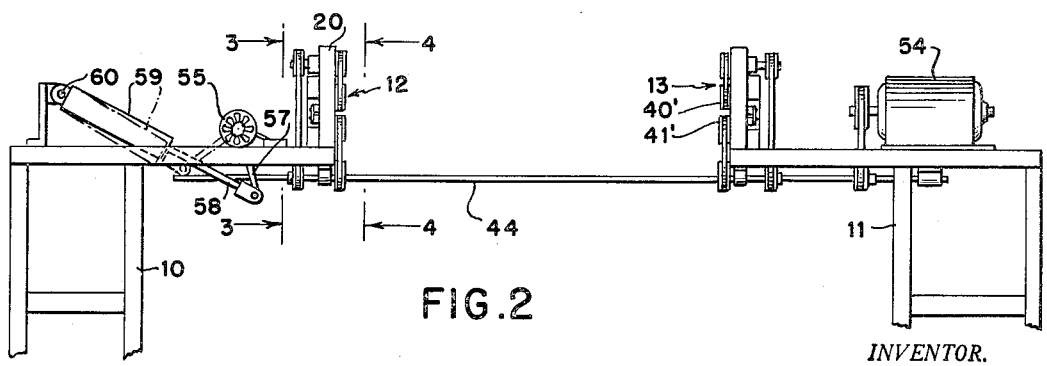
INVENTOR.
Samuel S. Day
BY
Adams, Forward & McLean
ATTORNEYS Sept. 27, 1955　　　　　　　S. S. DAY　　　　　　　2,718,660
APPARATUS FOR RECOILING COILS
Filed Jan. 4, 1955　　　　　　　　　　　　　　3 Sheets-Sheet 3
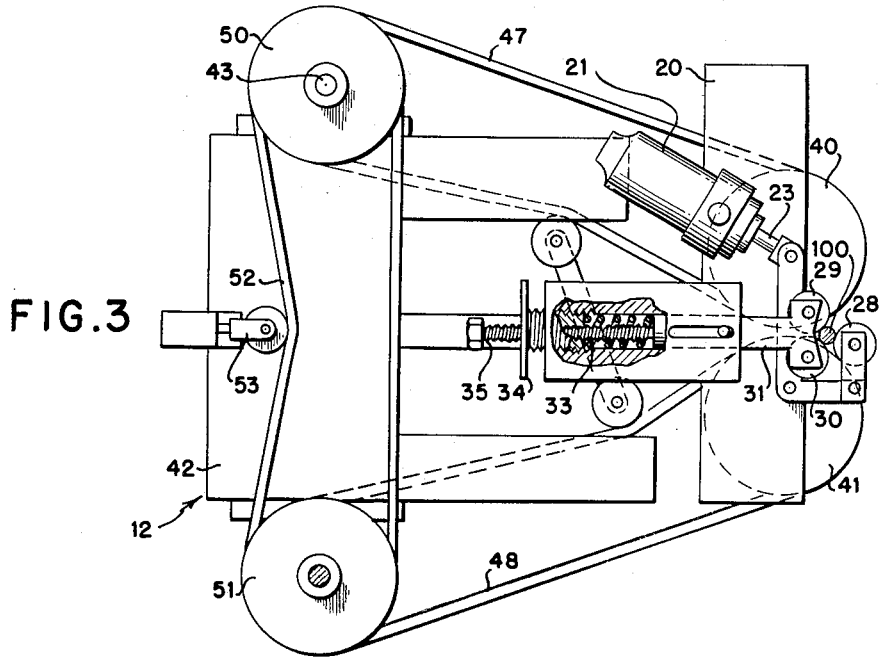
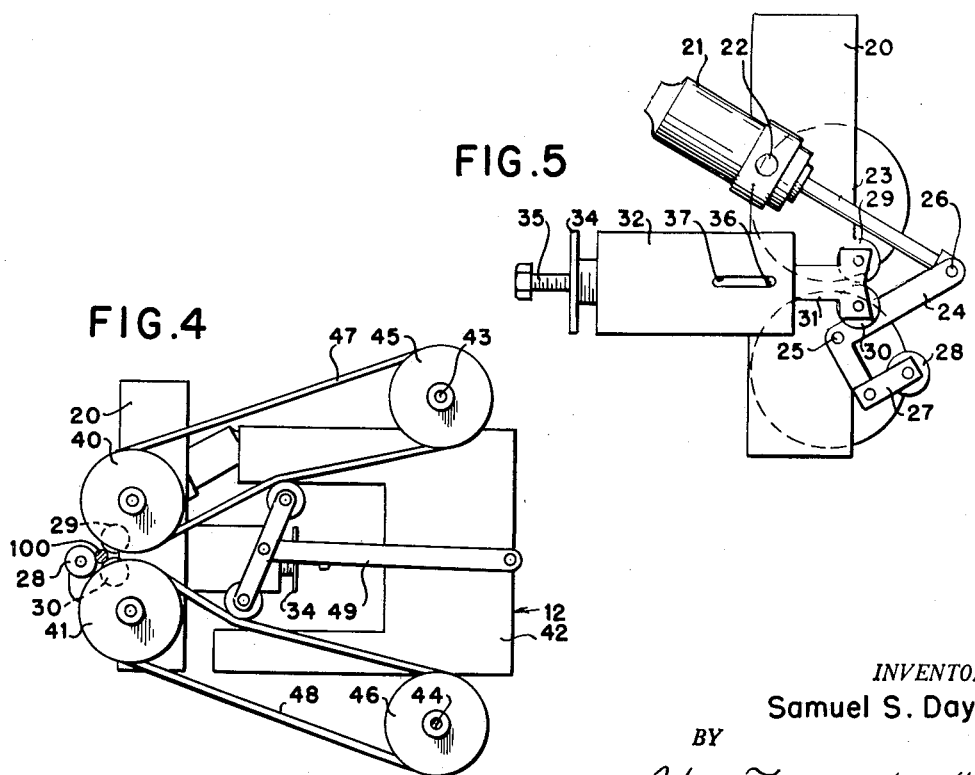
INVENTOR.
Samuel S. Day
BY
Adams, Forward & McLean
ATTORNEYS United States Patent Office 2,718,660
Patented Sept. 27, 1955

2,718,660

APPARATUS FOR RECOILING COILS

Samuel Sherwood Day, New Haven, Conn., assignor to Whitney Blake Company, New Haven, Conn., a corporation of Connecticut Application January 4, 1955, Serial No. 479,836

4 Claims. (Cl. 18—1)

This invention relates to the manufacture of retractile cords and provides, in particular, an apparatus for simultaneously unwinding and reversing preformed helically wound cords.

United States Patent 2,173,096 to Campbell discloses that retractile, i. e., elastically extensible, cords, such as electrical cables, can be formed by molding an elongated resilient body in helical form, thereafter reversing the pitch of the loops constituting the helix.

Usually, and particularly in the case of electrical cables, the elongated resilient body is prepared in helical form by winding an uncured plastic material, such as unvulcanized rubber, helically about a mandrel. Thereafter the mandrel and winding are subjected to heat or other suitable curing conditions to set the winding in its helical form. The helix is then removed from the mandrel and thereafter the pitch of the loops of the helix is reversed.

The Campbell patent also proposes that unwinding of the helix from the mandrel and pitch reversal can be accomplished in essentially a continuous operation in which the helix is unwound from a first mandrel and fed to a second mandrel upon which it is rewound in a reverse direction.

Commercially, however, it has been found preferable to remove the helix from the vulcanizing mandrel and, thereafter, securing one end of the helix in a rotatable chuck, to rewind the helix in the opposite direction by rotating the chuck in the same direction as the pitch of the helix, retaining the other end of the helix in a fixed position. This method of pitch reversal is disclosed in United States Patent 2,478,861 to Collins et al.

A particularly suitable mandrel upon which a helix of any desired length may be readily wound, vulcanized and removed is disclosed in United States Patent 2,586,763 to Judisch. The mandrel comprises a winding arbor, which usually is a straight cylindrical bar, upon which are mounted a pair of terminal holding heads. The heads are essentially identical and are placed over opposite ends of the arbor confronting each other. One head, the winding head, is affixed to the arbor at all times while the other head, the clamping head, is adjustably slidable along the arbor to be fixed in any desired position by a thumb screw. The confronting faces of the two heads are each provided with a groove about the arbor for receiving an end loop of the helix and are also provided with a tangential branch groove for receiving a free end of the helix. In usage, the clamping head is released and slipped down toward the end of the arbor away from the winding head. Pre-cut cord having an uncured or partially cured body is then wound on the arbor, laying one end of the cord in the branch groove of the winding head, and thereafter rotating the arbor and feeding the cord onto the arbor in a tightly arranged, single layer winding. As the other end of the cord is reached, the clamping head is slipped down tightly against the coil with the end being received by the branch groove of the clamping head. The clamping head is then secured and the assembled mandrel and winding are placed in an oven, or are otherwise subjected to curing conditions, to set the plastic body to a resilient elastic condition. After curing, the clamping head is loosened or removed and the helix which has been formed is unwound or slipped off the arbor. Thereafter, the pitch of the helix must be reversed.

It is a particular object of this invention to accomplish simultaneous unwinding and pitch reversal of cords helically wound upon an arbor eliminating the necessity of manual removal and handling intermediate the unwinding and reversing steps which has heretofore usually been employed.

It is a further object of this invention to utilize the high speed reversing technique of Collins et al. while at the same time unwinding the helix from the mandrel upon which it was formed.

It is still another object of this invention to provide an apparatus which is particularly suitable for unwinding and reversing helical cords formed on the mandrel of the type disclosed and claimed in the Judisch patent.

These and other objects of this invention are accomplished by mounting the mandrel for rotative movement connecting one end of the helix to a rotatable chuck and thereafter driving the chuck, while rotating it, in a direction approximately perpendicular to the mandrel. The essence of this invention lies in employing means for assisting rotary movement of the arbor, i. e., mandrel, as the helical cord is being drawn from it in order to reduce tension on the cord withdrawn from the mandrel to a minimum permitting the rotary movement of the chuck to cause the coils of the helix to fall into a reversed series of loops.

It is also contemplated by this invention to accomplish automatic rejection of an emptied arbor from the apparatus while simultaneously loosening the thumb screw on the mandrel clamping head to release the clamping action on the coil retained on the mandrel by use of a pressure responsive device which engages the thumb screw, rotates it in a counterclockwise direction and at the same time releases the jaws to eject a mandrel from a previous unwinding operation, freeing the jaws for receiving the mandrel which has just been loosened.

These and other objects of this invention are more fully explained in the accompanying drawings to which reference is made hereinafter and in which:

Figure 2 is an elevation of part of the apparatus shown in Figure 1;

Figure 3 is an end view of part of the apparatus shown in Figure 2 taken along line 3—3 in Figure 2 and shown on an enlarged scale;

Figure 4 is a view of the same part of the apparatus shown in Figure 3 seen from line 4—4 in Figure 2 on a scale intermediate that shown in Figures 2 and 3;

Figure 5 is a view similar to Figure 3 of part of the apparatus shown in Figure 3 showing the operation thereof;

Figure 6 is a partially cut away side elevation of another part of the apparatus shown in Figure 1; and Figure 7 is a cross-sectional view of the apparatus shown in Figure 6 taken along line 7—7 in Figure 6.

Figure 1:
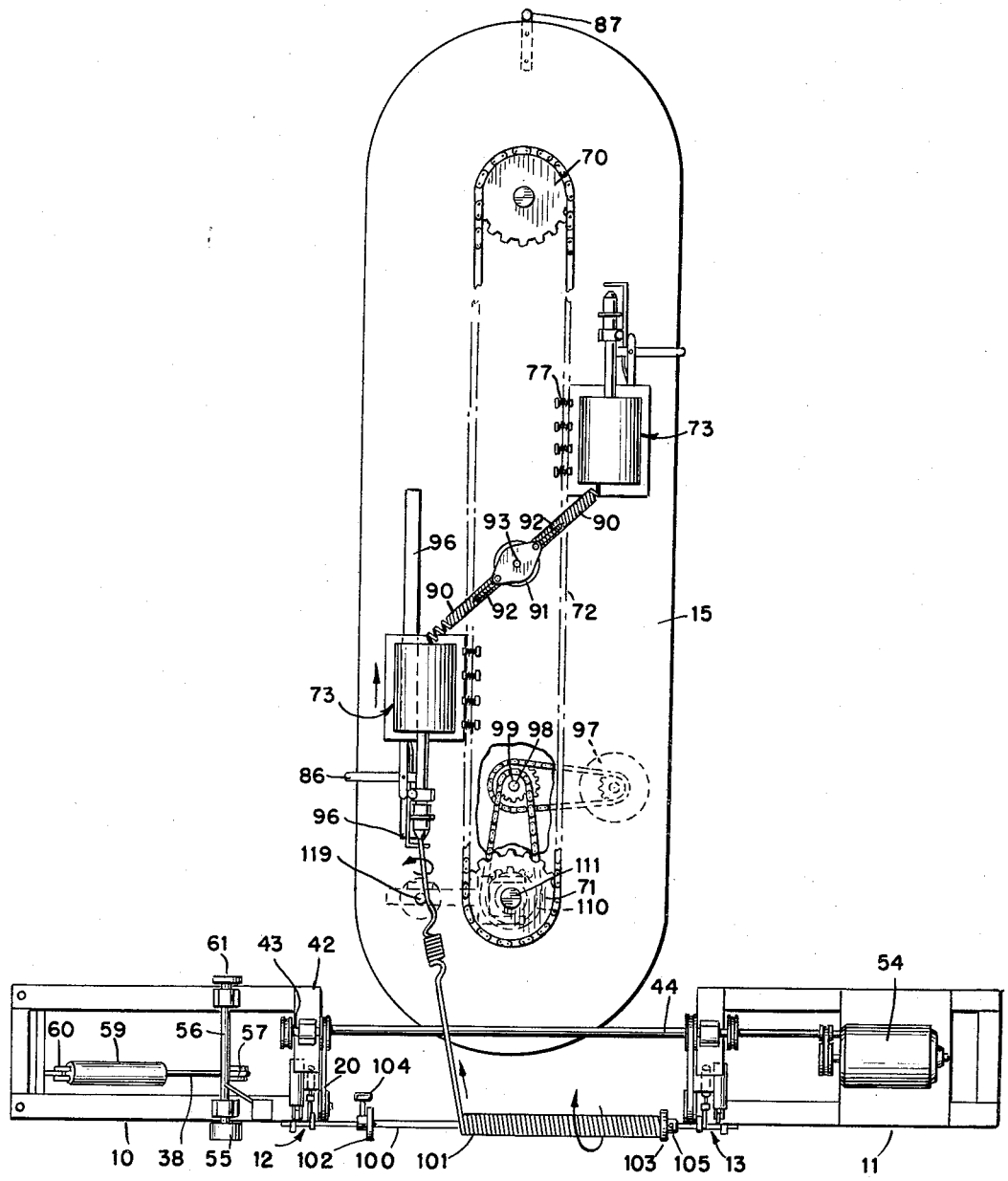
Figure 1 is a plan view of an apparatus embodying the principles of my invention for simultaneously unwinding and reversing a helix wound on a mandrel.

In the drawings the reference numerals 10 and 11 denote respectively left and right hand stands supporting aligned and confronting mandrel receiving heads 12 and 13, respectively. The reference numeral 15 represents an elongated oval table which is positioned with its major axis at approximately right angles to the line of stands 10 and 11 and with its surface in approximately the same horizontal plane as the upper surfaces of stands 10 and 11.

Heads 12 and 13 are substantially identical except that the arrangement of parts are reversed so that the inside faces of each, which confront each other, are mirror images. Referring to head 12 as explanatory of both, subject to the above exception, and in particular referring to Figures 3, 4 and 5, it will be seen that head 12 includes suitable jaws (see Figure 5) for receiving the end of a mandrel of the type shown in the Judisch patent referred to hereinbefore, a pair of rotating elements rotating in the same direction in close proximity to the jaws (see Figure 4) and means for driving the rotating elements and for permitting the jaws to move in a direction tending to cause the mandrel contained in the jaws to engage the rotating elements (see Figure 3).

The jaws themselves are supported by an upright member 20 secured to a frame 10 and include an air cylinder and piston unit 21 pivotally mounted to upright 20 at 22 which reciprocates a piston rod 23. Unit 21 is single acting to extend rod 23 and is provided with a spring biased return mechanism. A bell crank 24 pivotally mounted to upright 20 at its elbow 25 is secured at its long end 26 by pivotal connection to the outer end of piston rod 23. A small stub 27 affixed at right angles to the shorter end of bell crank 25 pivotally supports a wheel 28. Reciprocating movement of piston rod 23 thus causes wheel 28 to describe an arcuate path from a closed position shown in Figure 3 to an open position shown in Figure 5. Wheel 28 in the closed position bears against a mandrel 100 inserted in the apparatus.

Opposing the action of wheel 28 on mandrel 100 are a pair of wheels 29 and 30 which are supported pivotally with their axes vertically superposed on a T-member 31. T-member 31 is horizontally slidable in housing 32 with its long end extending into housing 32. A spring 33 retained in housing 32 bears against the end of T-member 31 tending to urge T-member 31 outwardly and thus cause wheels 29 and 30 to bear against a mandrel 100 as illustrated in Figure 3, opposing the action of wheel 28. Tension of spring 33 is adjusted by means of a collar 34 which threadedly engages housing 32, the inner end of which collar bears against one end of coil 33 causing the other end of coil 33 to bear against the inner end of T-member 31. A bolt 35 threadedly passed through collar 34 positively limits the inward travel of T-member 31, while a stud 36, extending perpendicularly to and horizontally from the inner end of T-member 31 and resting in a horizontal slot 37 in housing 32, limits the outward travel of T-member 31.

A pair of pulley wheels 40 and 41 pivotally secured to upright 20 with their axes vertically superposed are positioned on the oposite side of upright 20 from wheels 29 and 30. Wheels 40 and 41 are arranged such that their peripheries are spaced a slight distance apart, less than the thickness of the mandrel 100 to be retained by wheels 28, 29 and 30, and are positioned with respect to wheels 29 and 30 such that a mandrel 100 riding between wheels 28, 29 and 30 will be brought into engagement with wheels 40 and 41 approximately simultaneously, when wheels 29 and 30 are drawn inwardly with T-member 31 sliding into housing 32, at some point within the inner and outer limits of travel of T-member 31.

A second upright 42 also secured to standard 10 supports at its upper end a horizontal axle 43 and at its lower end a horizontal axle 44. Axle 44 extends the length of standards 10 and 11 and is common to both heads 12 and 13, whereas axle 43 is mounted only on head 12 and a corresponding axle 43' is mounted on head 13. On the inner face of head 12 (see Figure 4) axle 43 carries a pulley wheel 45 and axle 44 carries a pulley wheel 46. Both wheels 45 and 46, as well as wheels 40 and 41, are grooved to carry a conventional V-belt. Upper wheel 45 and wheel 40 are interconnected by V-belt 47, and lower wheel 46 and wheel 41 are interconnected by V-belt 48. A conventional idling device 49 secured to upright 42 having wheels bearing against both V-belts 47 and 48 is employed to equalize and adjust tension on the two belts. On the outside of head 12, axle 43 carries a pulley wheel 50 and axle 44 carries a pulley wheel 51. Wheels 50 and 51 are interconnected by a V-belt 52 on which tension is adjusted by a spring type idler 53 secured to upright 42.

Axle 44 is driven by a suitable motor 54 located on stand 11. Thus motor 54, by means of the interconnected belts and pulleys causes wheels 40 and 41 on head 12 and the corresponding wheels 40' and 41' on head 13 to rotate all in the same direction. The size of the pulleys are selected such that all four wheels engaging mandrel 100 rotate at approximately the same speed. However, by adjusting the size of a pulley in each of heads 12 and 13, one set of wheels 40 and 40' or 41 and 41' are caused to rotate faster, which pair being determined by the direction of rotation of mandrel 100 as a helix 101 wound thereupon is unwound. As shown in Figure 1, the helix 101 unwinds from an end passing over the top of mandrel 100. Consequently, the rotation of the wheels 40 and 41 as seen in Figure 4 is clockwise. Under such circumstances wheels 40 and 40' are adjusted to turn slightly faster than wheels 41 and 41'. The purpose of this is to prevent mandrel 100 from being drawn into the space between wheels 40 and 41, or between the corresponding wheels on head 13, and thus being jammed. The faster movement of one wheel tends to throw the mandrel out of such space thus preventing such occurrence.

Stand 10, as particularly shown in Figures 1 and 2, is also equipped with a pressure responsive device which is operatively connected to reject an arbor 100 retained in heads 12 and 13 as well as to release clamping head 102 on arbor 109. The device includes an internally fluted cone 55 mounted on an axle 56 horizontally supported across frame 10 for sliding movement lengthwise of axle 56. A crank 57 extends downwardly from axle 56 and is pivoted at its free end to a piston rod 58 powered for reciprocating movement by a cylinder and piston unit 59 pivotally mounted to frame 10 at point 60. Unit 59 is single acting to extend rod 58 and is provided with a spring biased return mechanism. The end of axle 56 opposite fluted cone 55 is positioned to bear against a pressure sensitive air valve 61 connected upon actuation to supply air to the cylinder of unit 59 and also to the cylinders of unit 21 on head 12 and its corresponding unit 21' on head 13. Thus, using a mandrel of the type shown in the Judisch patent having an arbor 100, a winding head 103 affixed thereto by a set screw 105 and a clamping head 102 adjustably positioned thereon by a thumb screw 104, placing the head of thumb screw 104 into fluted cone 55 causes axle 56 to slide, yielding to the pressure of insertion of thumb screw 104, thus actuating valve 61. The further operation of this device will be described hereinafter with reference to the operation as a whole.

Oval table 15, as described hereinbefore, is positioned with its major axis perpendicular to the line of stands 10 and 11 with one end extending into the space between stands 10 and 11. Referring for the moment to Figure 1, it will be seen that a pair of sprocket wheels 70 and 71 are mounted at the centers of the ends of table 15 for rotation about vertical axes and are positioned slightly above the level of table 15. Sprockets 70 and 71 are interconnected by a conventional roller link chain 72 to which are attached a pair of carriages 73. Each carriage 73 includes a chassis 74 supported on suitable wheels 75, permitting the carriage 73 to ride on the surface of table 15 following movement of chain 72. Chassis 74 along its inner side is connected to chain 72 by a number of studs 76 bolted to the side of chassis 74 with springs 77 riding on studs 76 inside right angle clips 78 mounted on top of chain 72. It will be thus evident that as sprockets 70 and 71 rotate, chain 72 will drive carriages 73 about table 15, the stud and spring combinations permitting carriages 73 to circle the ends of oval 15. The two carriages 73 are positioned on table 15 and are secured to chain belt 72 such that at all times they are exactly opposite each other.

Each carriage 73 includes a motor 79 having an output shaft 80 on which a line grasping chuck 81 is affixed. These line tightening devices 81 are conventional for securing cords, lines and the like by insertion of the end of such a line into an opening in the outer end of device 81. Extension of the casing of the device against internal spring biasing toward the opening opens jaws within the device, and retracting the casing device under normal internal biasing away from the opening tends to close the jaws causing them to grasp the line.

A slide 82 mounted on shaft 80 is positioned so that it may be brought to bear against the inner end of the outer casing of device 81 to extend it away from motor 79 and thus cause the line grasping device 81 to release the line held in its jaws, and, conversely, to permit a line to be inserted within the jaws of the device. A lever 83 pivoted at its lower end to chassis 74 and pivoted near its center to slide 82 by means of a handle 84 affixed to its upper end can be utilized to open and close the jaws within device 81 and thus permit manual operation of the device for insertion of an end of helix 101.

A second lever 85 mounted along side shaft 80 with an end hook extending in front of the opening of device 81 is pivotally secured intermediate its ends to slide 82 and is pivotally linked at its remote end to chassis 74 in such a manner that movement of slide 82 tending to open the jaws in device 81 lifts the hooked end of lever 85 up to the level of the jaws. Another lever 86 mounted horizontally and approximately transversely to chassis 74 is pivotally secured intermediate its ends to chassis 74. The outer end of lever 86 projects from chassis 74 opposite chain 72. Lever 86 is pivotally linked at its inner end to lever 85 intermediate its pivoted connections to chassis 74 and slide 82 in such a manner that movement of the outer extension of lever 86 along the line of travel of carriage 73 causes a corresponding movement of slide 82 along shaft 80. An upright 87 affixed at the edge of table 15 most remote from stands 10 and 11 is positioned to trip lever 86 as each carriage 73 passes and thus releases the jaws of line grasping device 81 and at the same time raises the hooked end of lever 85.

Carriages 73 are each connected to electric power for motors 79 by means of a retractile electrical cable 90 which is connected to a swivel commutator post 91. Coil spring 92 attached intermediate the ends of each cord 90 and fastened to a post 93 supported upon swivel commutator post 91 is employed to reduce the tension on the connection between cords 90 and commutator posts 91. The electrical circuit to each motor 79 through its respective cord 90 and commutator post 91 includes a position sensitive circuit maker 94 of the type commonly referred to as a microswitch positioned beneath chassis 74 and operable such that upward movement of an operating member 95 closes the circuit to motor 79. A cam surface 96 extending lengthwise on table 15 is positioned to actuate members 95 and thus cause rotation of motor 79 over a portion of the distance which carriage 73 travels in a clockwise direction about table 15 (see Figure 1) as it leaves the proximity of stands 10 and 11.

Sprocket 71 which drives chain 72 is driven by a motor 97 mounted beneath table 15. Motor 97 drives a vertical axle 98 on which is fixed a sprocket 99 connected to a freely rotating sprocket 110 mounted on vertical axle 111 to which sprocket 71 is fixed. A clutch arrangement, including a ring 112 which is rotatably retained about the hub of friction clutch plate 113, slidably mounted on and rotatably keyed to axle 111, is slidable along axle 111 into frictional engagement of plate 113 with sprocket 110 to cause axle 111 to rotate. Sprocket 71 thereby causes belt 72 to turn in a clockwise direction as shown in Figure 1 driving carriages 73 about the oval surface of table 15.

Clutch 113 is reciprocated into engagement with sprocket 110 by a lever 114, pivoted intermediate its ends to the stand 115 upon which table 15 rests, by means of a clevis connection 116 between one end of lever 114 and clutch ring 112. The opposite end of lever 114 is pivotally connected to the end of a piston rod 117 which is actuated by an air cylinder and piston unit 118. Unit 118 is single acting to retract rod 117 and is provided with a spring biased return mechanism. Intermediate the piston rod connection and the pivoted connection to stand 115, lever 114 is pivotally connected beneath table 15 to the lower end of plunger 119. The upper end of plunger 119 extends upwardly through table 15 and terminates in its highest position above the surface of table 15. An inclined ramp 120 positioned underneath carriage 73 and attached to chasis 74 is arranged to engage with the upper end of plunger 119, when extended in its upper position, and to fail to engage plunger 119, when retracted to a lower position in which clutch plate 113 and sprocket 110 are in engagement.

In operation, motor 97 and motor 54 are constantly turning. Thus wheels 40, 40', 41 and 41' are constantly turning in the directions indicated hereinbefore. Also at the beginning of a cycle of operation, one carriage 73 is stalled with ramp 120 engaging plunger 119, while the other carriage 73 is remotely located at the opposite end of the table. Microswitch 94 is unactuated and an empty mandrel 100 is retained by wheels 28 and 28' in engagement with wheels 29, 29', 30 and 30'. Cylinder and piston units 21, 21', 59 and 118 are all unactuated.

The operator proceeds to take a mandrel 100 on which is wound a vulcanized helix 101 retained between a winding head 103 and a clamping head 102. With the clamping head 102 placed toward the left, the operator inserts the head of thumb screw 104 into the fluted cone 55. Actuation of air valve 61 which is of the slow release type causes cylinder and piston unit 59 to extend piston rod 58 outwardly thus rotating fluted cone 55 in a counterclockwise direction releasing the setting of thumb screw 104. (In some circumstances it will be found desirable to employ a compound action or a motor driven worm and spur gear attachment in order to provide more than the approximately quarter turn release of the design shown.) At the same time air valve 61 causes piston rods 23 and 23' to be extended from piston and cylinder units 21 and 21' against the spring biasing in such units, lowering wheels 28 and 28', respectively, and releasing the empty arbor 100 retained in the machine. The dumped arbor drops on wheels 41 and 41' and is thrown into a bin (not shown) disposed beneath the level of stands 10 and 11 and placed between them. Conveniently, guide flanges (not shown) are employed to catch the ends of arbor 100 as it is expelled from the machine to insure proper collection in such a bin.

The operator then immediately places the newly loosened mandrel 100 containing a helix 101 in the place of the expelled mandrel. Since air valve 61 is of the slow release type, after a delay of one or two seconds the normal spring biasing of units 21 and 21' will cause wheels 28 and 28' to return to their normal closed position engaging the ends of the newly placed arbor 100. The operator then slides the clamping head 102 away from the end of helix 101 retained by it. Grasping the freed end of helix 101 with one hand and pulling handle 84 with the other, the operator inserts the end of helix 101 into line grasping device 81. Release of handle 84 under the internal spring action of line grasping device 81 causes the jaws of the device to close and grasp the end of helix 101. The operator then manually or pedally actuates a second air valve (not shown), also of the slow release type, which actuates cylinder and piston unit 118 withdrawing piston rod 117, thereby engaging clutch 113 to cause sprocket 71 to rotate and at the same time withdrawing plunger 119 releasing carriage 73.

Carriage 73 is then driven away from arbor 100 carrying the end of helix 101 with it, causing arbor 100 to rotate. A short distance away from arbor 100 micro-switch 94 is tripped by cam 76 and motor 79 starts to rotate. The rotation continues for the length of cam 96 and by inertia for a short distance beyond. Also before carriage 73 has been carried more than a fraction of the distance to the remote table 15, the air release on cylinder and piston unit 118 permits piston rod 117 under normal spring biasing to be extended again from cylinder 118 thus releasing engagement of clutch 113 and extending plunger 119 into a position in which it will engage the next carriage 73 as it approaches. The remainder of the drive of carriages 73 is under momentum solely, and they are carried half way around the table until engagement of ramp 120 with plunger 119 brakes a carriage 73 to a stop in position for reloading.

In the meantime, the rotation of motor 79 as shown in the arrows in Figure 1 is in such a direction as to cause recoiling of helix 101 with a reversed pitch. In order to accomplish such recoiling, I have found it necessary to assist the unwinding motion by imparting extraneous rotary movement to arbor 100 in order to relieve the tension on helix 101 and permit it to recoil. This is accomplished by setting springs 33 and 33' at such a tension that as maximum permissible tension on helix 101 is approached, arbor 100 is drawn into engagement with wheels 40, 40', 41 and 41' which are rotated faster than the natural unwinding speed of arbor 100 and consequently impart an additional rotation to arbor 100 for a moment relieving tension on coil 101 permitting it to be recoiled freely. Engagement of arbor 100 with wheels 40, 40', 41 and 41' can be adjusted by means of the setting of spring 33 from a point in which arbor 100 is almost constantly in engagement with the wheels to a point to which it is intermittently in momentary engagement therewith during the withdrawal of a single helix.

When helix 101 is fully unwound, which occurs toward the end of the movement of carriage 73 away from arbor 100, carriage 73 is carried around the far turn of table 15 and upright 87 trips lever 86 releasing line grasp device 81 thus freeing the recoiled helix 101 to be collected in a bin (not shown) located at the far end of table 15. The hooked arm of lever 85 as noted before under such motion will lift to the level of the opening in line grasp device 81. This has been found necessary in order to facilitate the withdrawal of the end of helix 101 which, under the influence of gravity and momentum of the drive of carriage 73, tends to bend so sharply in the opening in device 81 as to wedge itself in the jaws even when open. The rounding of the curve at the end of table 15 tends to straighten helix 101 in the opening of device 81 against horizontal bending forces, while the hooked arm of lever 85 overcomes bending under the influence of gravity, thus permitting helix 101 to be freely thrown from device 81.

As the other carriage 73 rounds the near end of table 15, as noted above, it is brought to a stop by plunger 119. An experienced operator in the meantime will have replaced the unwound arbor 100 with a loaded arbor and operation resumes as described hereinabove.

I claim:
1. An apparatus for simultaneously unwinding and reversing the pitch of an elongated resilient body wound in a helix upon an arbor which comprises a pair of aligned jaws confronting each other for rotatably receiving opposite ends of an arbor, a chuck for receiving an end of an elongated body, means for driving said chuck a predetermined distance in a line at approximately right angles to the line of said jaws from a position in the proximity of said jaws to a position more remote therefrom, means for rotating said chuck about an axis approximately at right angles to the line of said jaws in a direction reversing the pitch of a helix wound upon an arbor mounted in said jaws, an end of which helix is positioned in said chuck, means operating said chuck rotating means during operation of said chuck driving means, means for rotating an arbor retained in said jaws in a direction unwinding a helix wound upon said arbor, and means for operating said arbor rotating means responsive to tension on a helix wound on an arbor retained in said jaws, one end of which helix is retained in said chuck.

2. An apparatus according to claim 1 in which said chuck is mounted on an oval race, one long side of which carries said chuck away from said arbor and the other long side of which returns said chuck to said arbor and in which means are employed to release the grasp of said chuck on the end of a helix responsive to the positioning of said chuck at the remote end of said oval from said jaws.

3. An apparatus according to claim 1 in which said arbor rotating means comprises a pair of wheels, means for rotating said wheels in a direction in which engagement therewith of an arbor retained in said jaws will rotate said arbor in a direction unwinding a helix wound upon said arbor, and in which said means operating said arbor rotating means comprises a spring biasing said jaws to a position in which an arbor retained in said jaws is out of engagement with said rotating wheels, the tension on said spring being selected to permit said spring to yield said jaws to a position in which an arbor retained in said jaws engages said wheels at a predetermined tension upon a helix being unwound by the movement of said chuck from an arbor retained in said jaws.

4. An apparatus according to claim 1 for simultaneously unwinding and reversing the pitch of an elongated resilient body wound in the helix upon an arbor between a fixed winding head and a releasable clamping head which further comprises means for engagement with a release means on said clamping head, and means responsive to engagement of said release means and said engaging means to actuate said release means and to eject an arbor retained in said jaws.

References Cited in the file of this patent
UNITED STATES PATENTS

| | | |
|---|---|---|
| 2,173,096 | Campbell | Sept. 19, 1939 |
| 2,413,715 | Kemp et al. | Jan. 7, 1947 |
| 2,478,861 | Collins et al. | Aug. 9, 1949 |
| 2,525,285 | Collins et al. | Oct. 10, 1950 |
| 2,547,356 | Ames | Apr. 3, 1951 |
| 2,575,747 | Cook | Nov. 20, 1951 |